July 5, 1932.  F. MORTENSEN  1,866,478
END OR BOTTOM BEARING FOR QUICK REVOLVING SHAFTS OR SPINDLES
Filed Aug. 10, 1928

INVENTOR
*Frantz Mortensen*
BY
*Munn & Co*
ATTORNEY

Patented July 5, 1932

1,866,478

UNITED STATES PATENT OFFICE

FRANTZ MORTENSEN, OF HELSINGFORS, FINLAND

END OR BOTTOM BEARING FOR QUICK REVOLVING SHAFTS OR SPINDLES

Application filed August 10, 1928, Serial No. 298,726, and in Germany August 20, 1927.

The present invention relates to improvements in spindle bearings and consists in the constructions, arrangements and combinations herein described and claimed.

It is an object of the invention to provide a bearing creating a minimum of friction and wherein means are provided for support of the spindle in the event of breakage of the main supporting bearing, thus avoiding serious damage to the spindle or other portions of a machine equipped therewith.

Additional objects, advantages and features of invention will be apparent from the following description and accompanying drawing wherein.

Figure 1:
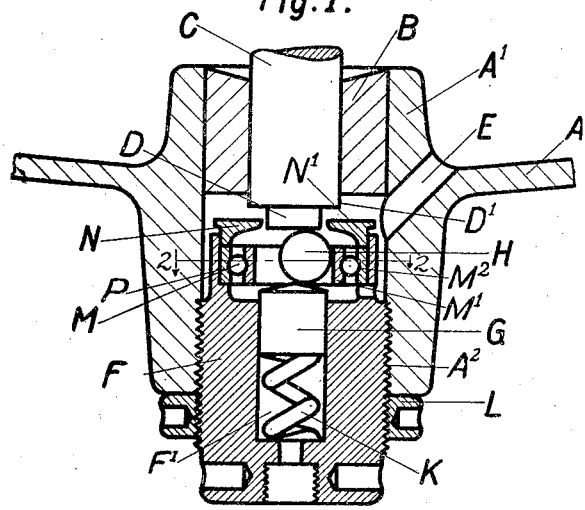
Fig. 1 is a vertical sectional view of a separator frame having my bearing installed therein.
Figure 2:
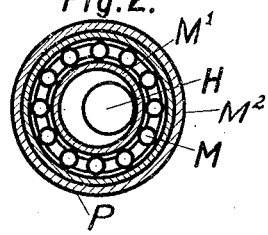
Fig. 2 is a cross section on the line 2—2 of Fig. 1.

In the drawing, the reference character A designates a separator frame including a hub portion $A^1$ having a bore, the lower end of which is interiorly threaded as at $A^2$. Within the bore and at the upper end thereof I provide a bearing B revolubly supporting a spindle C, the lower end of which is reduced as at D, defining a shoulder $D'$.

Within the threaded portion $A^2$ of the bore there is a plug F, suitably screw threaded to permit adjustment thereof to various heights within the bore of the hub $A^1$. The plug F is of such length as to project below the hub $A^1$, and a lock nut L engageable upon the threads of the plug will secure the plug against movement when screwed into contacting relation with the lower portion of the hub.

The plug F is provided with an axial chamber $F^1$ having a cylindrical opening within which there is reciprocably mounted a pivot bearing G, the upper end of which is preferably of conical formation. The bearing G is resiliently supported by a helical spring K interposed between said bearing and the base of the chamber $F^1$.

An annular flange P integrally formed with the plug F confines a ball-bearing assembly M, which in the present instance, comprises inner and outer rings $M^1$ and $M^2$. The rings $M^1$ and $M^2$ are of less height than the flange P thereby providing an annular seat for a freely revoluble ring N. The ring N has an overhanging flange $N^1$ of such width as to be disposed beneath the shoulder $D^1$ of the spindle C. It should be noted that the reduced end D of the spindle C projects partly through the ring N, but does not come into actual contact therewith.

A ball bearing H is interposed between the reduced end D and the bearing G. The ball bearing H is of lesser diameter than the opening defined by the ring $M^1$ and therefore this ball bearing is free to revolve within the ring $M^1$ and is confined thereby.

The hub $A^1$ is provided with an opening E whereby a suitable lubricant may be fed to the various bearing members.

From the foregoing, it will be readily understood that the ball bearing H normally supports the spindle C, but in the event of breakage of this ball, the overhanging flange $N^1$ will engage the shoulder $D^1$ upon downward movement of the spindle C, thus effectively supporting the spindle.

I claim:

In combination, a shaft having a reduced end defining a shoulder, a bearing therefor, a closure for the outer end of the bearing, said closure having in its inner end a cylindrical opening, a resilient base in said cylindrical opening, a ball bearing assembly mounted in said closure and disposed outwardly of said cylindrical opening and having a freely revoluble ring, a ball freely rotatable in said ring and disposed between said reduced end and said resilient base, and an annular member carried by said bearing assembly having an overhanging annular flange disposed beneath the shoulder of said spindle, whereby said spindle will be supported in the event of breakage of said ball.

FRANTZ MORTENSEN.